INVENTORS
CARL HENRIC VON SIVERS
KURT REID WADÖ
KLAS RUDOLF WICKMAN
LARS BERNHARD PERSÖN
BY [signature]
ATTORNEY INVENTORS
CARL HENRIC VON SIVERS
KURT REID WADÖ
KLAS RUDOLF WICKMAN
LARS BERNHARD PERSON
BY Frederick E. Hane
ATTORNEY Oct. 23, 1956 C. H. VON SIVERS ET AL 2,768,352

COMPRESSOR-EXPANDER TRANSMISSION SYSTEM

Filed Oct. 10, 1951 6 Sheets-Sheet 3

INVENTORS
CARL HENRIC VON SIVERS
KURT REID WADÖ
KLAS RUDOLF WICKMAN
LARS BERNHARD PERSON
BY [signature]
ATTORNEY INVENTORS
CARL HENRIC VON SIVERS
KURT REID WADÖ
KLAS RUDOLF WICKMAN
LARS BERNHARD PERSON
BY Fredrick G. Hans
ATTORNEY

COMPRESSOR-EXPANDER TRANSMISSION SYSTEM

Filed Oct. 10, 1951 6 Sheets-Sheet 5

INVENTORS
CARL HENRIC VON SIVERS
KURT REID WADÖ
KLAS RUDOLF WICKMAN
LARS BERNHARD PERSON
BY [signature]
ATTORNEY Oct. 23, 1956 C. H. VON SIVERS ET AL 2,768,352
COMPRESSOR-EXPANDER TRANSMISSION SYSTEM
Filed Oct. 10, 1951 6 Sheets-Sheet 6

INVENTORS:
CARL HENRIC VON SIVERS
KURT REID WADÖ
KLAS RUDOLF WICKMAN
LARS BERNHARD PERSON
BY
ATTORNEY

United States Patent Office 2,768,352

Patented Oct. 23, 1956

2,768,352

COMPRESSOR-EXPANDER TRANSMISSION SYSTEM

Carl Henric von Sivers, Stockholm, Kurt Reid Wadö and Klas Rudolf Wickman, Hagersten, and Lars Bernhard Person, Stockholm, Sweden, assignors to Telefonaktiebolaget L M Ericsson, Stockholm, Sweden Application October 10, 1951, Serial No. 250,673

Claims priority, application Sweden October 20, 1950

11 Claims. (Cl. 333—14)

The present invention relates to a system improving the signal-to-noise ratio by momentary contraction or compression and expansion of signals transmitted from a transmitting station to a receiving station.

There are already known devices for improving the signal-to-noise ratio in transmission by introducing a contraction of the signal at the transmission end and an expansion of the signal at the receiving end. As contractor or compressor is used a device which has a higher amplification or a lower attenuation for low amplitudes than for high ones. With conventional systems, lowering the amplification with increased signal amplitude takes place continuously, whereby a curve of the expansion as a function of the contraction becomes a bent line. For controlling the amplification of the contractor, the signal is usually taken off and rectified, and the thus obtained control potential is caused to influence, for example, the grid potential of a tube with variable transconductance, a bridge coupling, or one or more variators or varisters. Thus, the control of the amplification does not take place momentarily but requires a certain time. Actually, the amplitude integrated over several periods determines the amplification. Under such conditions, an isolated potential or current peak of high amplitude but short duration is only little contracted. This is not important when the signal consists of sound frequencies, for instance a speech band. However, if the signal consists for instance of amplitude-modulated pulses belonging to several different channels, the control of the amplification has to be carried out momentarily. The curve over the output as a function of the input shall then constitute the dynamic amplification curve. This curve is bent, that is, the amplification varies continuously as a function of the momentary amplitude. Such bent amplification curve is produced by a non-linear element. The expansion of the signal at the receiving end takes place in an expansion device (expandor) which functions in the same manner as the contractor or compressor, with the exception that the amplification instead of decreasing increases with increased amplitude. For low amplitudes is, thereby, obtained an underamplification which compensates their overamplification in the contractor or compressor at the transmitting end, so that the total amplification in both the compressor and expandor (compandor) is equal and constant for all amplitudes. As a result, noise of relatively small amplitude which comes in over the transmission medium or the compressor receives a reduced amplitude after the expandor so that the signal-to-noise ratio is higher after the expandor than before the same.

To prevent the introduction of distortion by the compressor and expandor arrangement, the amplification curve in the expandor must exactly compensate the amplification curve in the compressor, so that the total amplification is constant and equal for all amplitudes. This is particularly difficult for bent amplification curves. An automatic control of the amplification curve of the expandor so that it exactly compensates the amplification curve of the compressor is also very difficult to obtain for bent amplification curves.

The present invention may be broadly defined as comprising momentarily acting compressors and expandors which provide a certain constant amplification for signal amplitudes up to a definite level and for amplitudes above this level, an amplification with a different constant value for the part of the potential or current exceeding the said level. The constant value of the amplification of the part of the amplitude which exceeds said level is lower for a compressor and higher for an expandor than the constant value of the amplification of the amplitudes below said level. The compressor and the expandor include non-linear elements, such as diodes which are used for changing from the constant amplification of one value over to the constant amplification of another value. Consequently, use is made of the properties of the diodes either to be conductive or non-conductive for current. This is in contrast to conventional systems using momentarily-acting compressors and expandors. In such systems the properties of the diodes of having a bent current-potential characteristic are employed.

With a system according to the invention, variations in the individual current-potential characteristics of the diodes are of no importance. An automatic regulation of the amplification curve of the expandor so that it exactly compensates the amplification curve of the compressor can be produced in a simple manner.

In the accompanying drawing several now preferred embodiments of the invention are shown by way of illustration and not by way of limitation.

In the drawing:

Figs. 1 and 2 are graphs showing the output voltage as a function of the input voltage of a compressor and an expandor respectively, according to the invention.

Fig. 2*a* is a block diagram of a system according to the invention.

Figure 1:
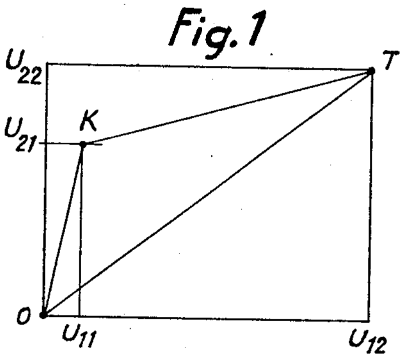
Figure 2:
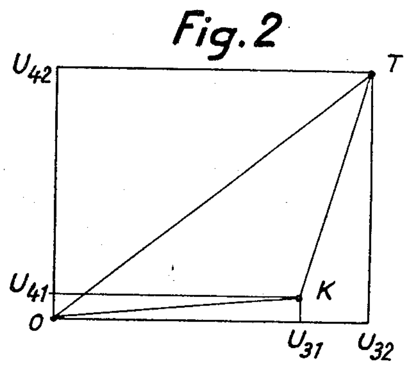

In Fig. 1, the graph O—K—T indicates output as a function of input for a compressor according to the invention, and in Fig. 2 the graph O—K—T indicates output as a function of input for an expandor according to the invention. The graphs O—K—T are assumed to consist of two straight sections OK and KT with a sharp bend at K. Noise which, after compression, arrives on the section O—K is reduced in the proportion $$\frac{U_{11}}{U_{12}} \cdot \frac{U_{22}}{U_{21}}$$

The improvement in the signal-to-noise ratio of the system then becomes $$A_c = -20.\log \frac{U_{11}}{U_{12}} \cdot \frac{U_{22}}{U_{21}} \text{ decibels}$$

The expandor and compressor are so adjusted that $$\frac{U_{31}}{U_{32}} = \frac{U_{21}}{U_{22}}$$

This ratio is called $$\frac{1}{l}$$

The expandor and compressor are further adjusted so that $$\frac{U_{11}}{U_{12}} = \frac{U_{41}}{U_{42}}$$

This ratio is called $$\frac{1}{k}$$

The improvement in the signal-to-noise ratio of the device can then be written $$A_c = 20 \log \frac{k}{1} \text{ decibels}$$

The values $k$ and $l$ define the entire system when the breaks are sharp or have curvatures which compensate one another.

Figure 2A:
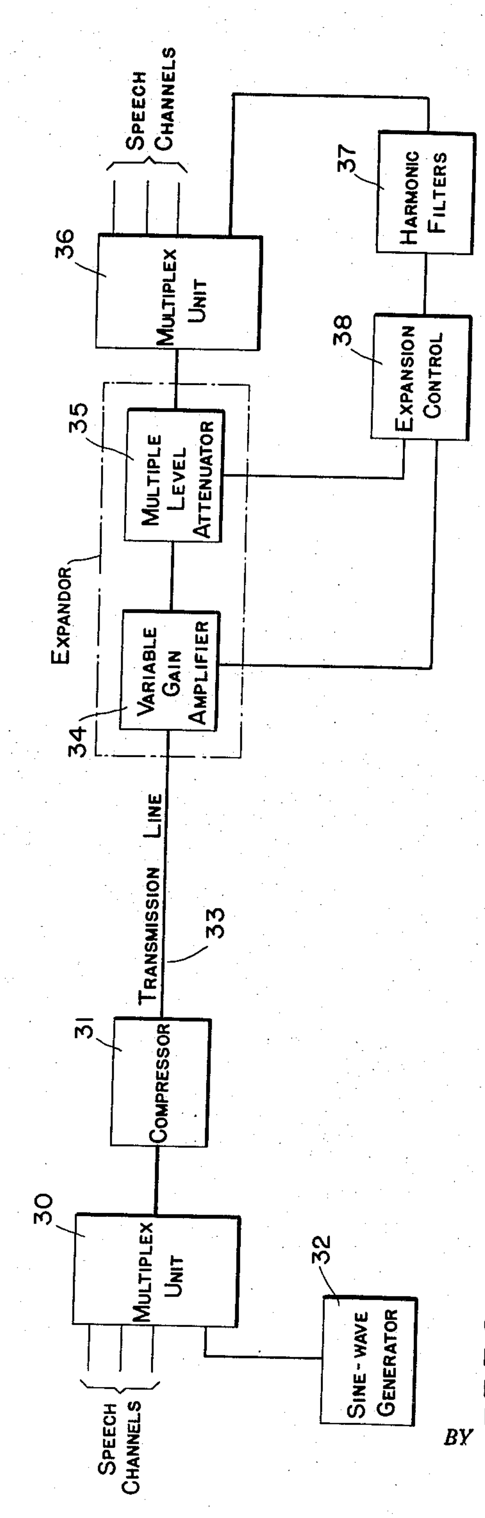

Figure 2*a* is illustrative of a complete system embodying the invention and comprises transmitting apparatus having a multiplex unit 30, a compressor 31 and a sine valve generator 32. The multiplex unit is illustrated as having three speech input channels and an auxiliary channel into which is fed the output of the sine wave generator. The output of the multiplex unit is fed to the compressor functioning in accordance for example with the curve of Figure 1. The output of the compressor is fed over a suitable transmission means 33 to the receiver or expanding apparatus having a variable gain amplifier 34, a multiple level attenuator 35 and a multiplex unit 36. The sine wave control signal is separated out by the multiplex unit 36 and fed to harmonic filters 37 and the expansion control 38 for separating certain odd and even harmonics resulting from the failure of the expandor exactly to reproduce the original signal. A control voltage corresponding to one or more odd harmonics is fed to the amplifier 34 to control the gain thereof and a second control voltage corresponding to one or more even harmonics is fed to the attenuator 35. The amplifier and attenuator are thus controlled exactly to reproduce the input signals fed to the multiplex unit 30.

Figure 3:
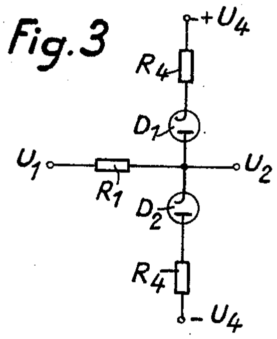
Fig. 3 is a circuit system of a compressor according to the invention.

Fig. 3 shows a compressor according to the invention. The signal which is to be subjected to compression is fed in at terminal $U_1$ into a series resistor $R_1$ and taken off at terminal $U_2$. Two diodes $D_1$ and $D_2$ are connected from point $U_2$ across the series resistor $R_4$ to their biases $+U_4$ and $-U_4$, respectively. The diodes are so arranged that they are normally non-conductive.

Figure 4:
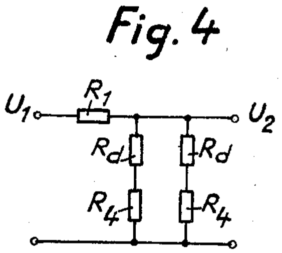
Figs. 4 and 5 are circuit diagrams of compressors of the type shown in Fig. 3.
Figure 5:
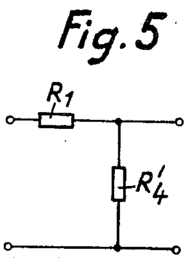

Fig. 4 shows a circuit diagram similar to the diagram according to Fig. 3, and Fig. 5 shows how the equivalent diagram can be further simplified to a simple L-network, where $$R_4^1 = \frac{R_d + R_4}{2}$$

When the diodes $D_1$ and $D_2$ are non-conductive, the impedances $R_d$ are high and, consequently, $R_4^1$ is also high. The circuit system then provides a low attenuation between the points $U_1$ and $U_2$ for a signal. The amplification is in practice one when $R_1 < R_d$. When a signal greater than $\pm U_4$ is applied, the diodes become conductive during the positive and negative peaks of the signal. The impedances $R_d$ then are low and thereby $$R_4^1 \approx \frac{R_4}{2}$$

that is, $R_4^1$ becomes a low impedance. The arrangement according to the equivalent diagram of Fig. 5 then will get an amplification $$R \frac{R_{4/2}}{R_1 + \frac{R_4}{2}} = \frac{1}{1 + \frac{2R_1}{R_4}}$$

the signals with an amplitude lower than $\pm U_4$ thus get an amplification practically equal to 1. Signals of higher amplitude get this amplification for the parts of the signal which are below the value $\pm U_4$ while the parts of the signal which exceed $\pm U_4$ receive a lower amplification, namely, $$\frac{1}{1 + \frac{2R_1}{R_4}}$$

The system should be so dimensioned that the back resistance of the diodes is considerably higher than $R_1$, and $R_4$ should be considerably higher than the series resistance of the diodes. With this dimensioning, the sections OK and KT in Fig. 1 become practically straight lines. The fact that the diodes are not ideal current interrupters manifests itself by a rounding of the break at K. The slopes of the lines OK and KT are determined in practice simply by the resistors included in the system. In order to linearize further the line OK, there may be applied a relatively high resistance parallel to each one of the diodes or between point $U_2$ and ground.

Figure 6:
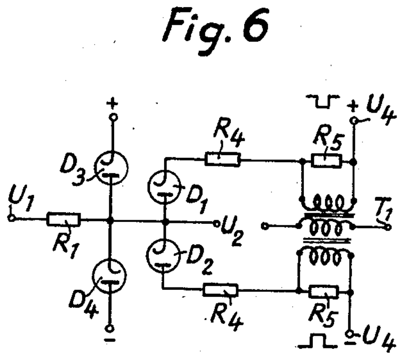
Figs. 6 and 7 are circuit systems of modified compressors according to the invention.

If $R_1$ is high, the stray capacitances at $U_2$ will store the residue of a preceding potential. In a pulse-amplitude-modulated multi-channel system, this may cause cross-talk to succeeding channels. Since $R_4$ is relatively low, one may conceive a discharge of the stray capacitances according to Fig. 6. Between the amplitude-modulated channel pulses there is inserted across transformer $T_1$ a discharge pulse which makes the diodes $D_1$ and $D_2$ conductive and thereby discharges the stray capacitances to point $U_2$ with a considerably shorter time constant than would otherwise be the case. The amplitude of the discharge impulse need be only a few volts, for which reason it is not necessary to introduce harmful asymmetries. The resistor $R_5$ across the secondary side of the transformer $T_1$ should be low so as best to damp transformer $T_1$. Fig. 6 also shows how a pure amplitude limiter consisting of diodes $D_3$ and $D_4$ can be included in the system.

Figure 7:
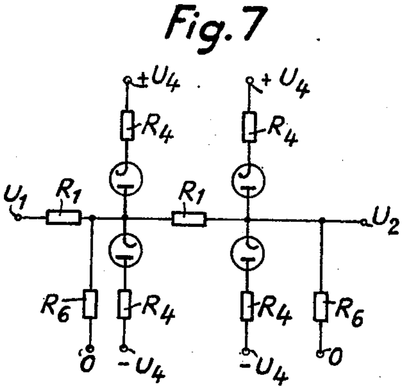

Fig. 7 shows a compressor made in two stages. The resistor $R_4$, in this case, may be made larger than in the preceding embodiment whereby a sharper break can be obtained at point K and better linearity for the section K—T of Fig. 1.

Some of the previously described compressors can be connected in an amplifier in the feedback branch whereby an expandor is obtained. In the same way, some of the expandors, described later on, may be connected in a feedback branch in an amplifier, whereby a compressor is obtained.

Figure 8:
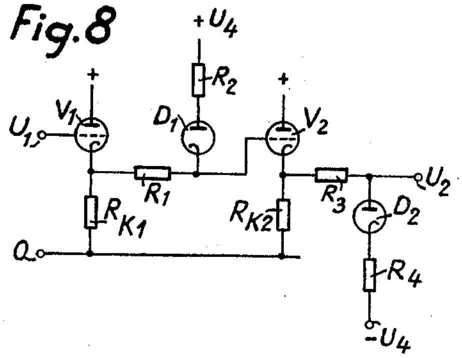
Fig. 8 is a circuit system of an expandor according to the invention.
Figure 9:
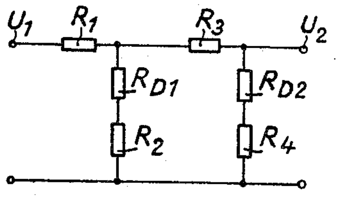
Fig. 9 is a circuit diagram of an expandor of the type shown in Fig. 8.

Fig. 8 shows an embodiment of an expandor according to the invention in which grid controlled tubes $V_1$ and $V_2$ operate as cathode followers with their respective cathode resistors $R_{k1}$ and $R_{k2}$. Diodes $D_1$ and $D_2$ of the system are normally conductive. The signal to be expanded is admitted at terminal $U_1$ and taken out at terminal $U_2$. For signals of low amplitude, an attenuation is obtained by reason of the fact that the system of Fig. 8 is equivalent to the system of Fig. 9 wherein $R_{D1}$ and $R_{D2}$ are series resistances of diodes $D_1$ and $D_2$. Signals of a higher amplitude will block above a certain level diodes $D_1$ and $D_2$ respectively, with their positive and negative peaks respectively. The diodes then become non-conductive and $R_{D1}$ and $R_{D2}$ become high impedances. For the parts of the signals above the said level, the amplification according to Fig. 9 then is practically equal to one. By a suitable selection of the resistors $R_1$, $R_2$ and $R_3$, $R_4$ the desired slopes of lines OK and KT of Fig. 2 are obtained. By the suitable selection of the bias $\pm U_4$ the desired value is obtained for the input voltage $U_{31}$ of Fig. 2. For this value, a change from the lower to the higher amplification is desired. The amplification curve of the expandor should thus be capable of adjustment so as to compensate the amplification curve of the compressor, so that the entire system with compressor and expandor gives the same total amplification for all amplitudes and, thereby, no increase in the distortion.

Figures 10, 11, 12:
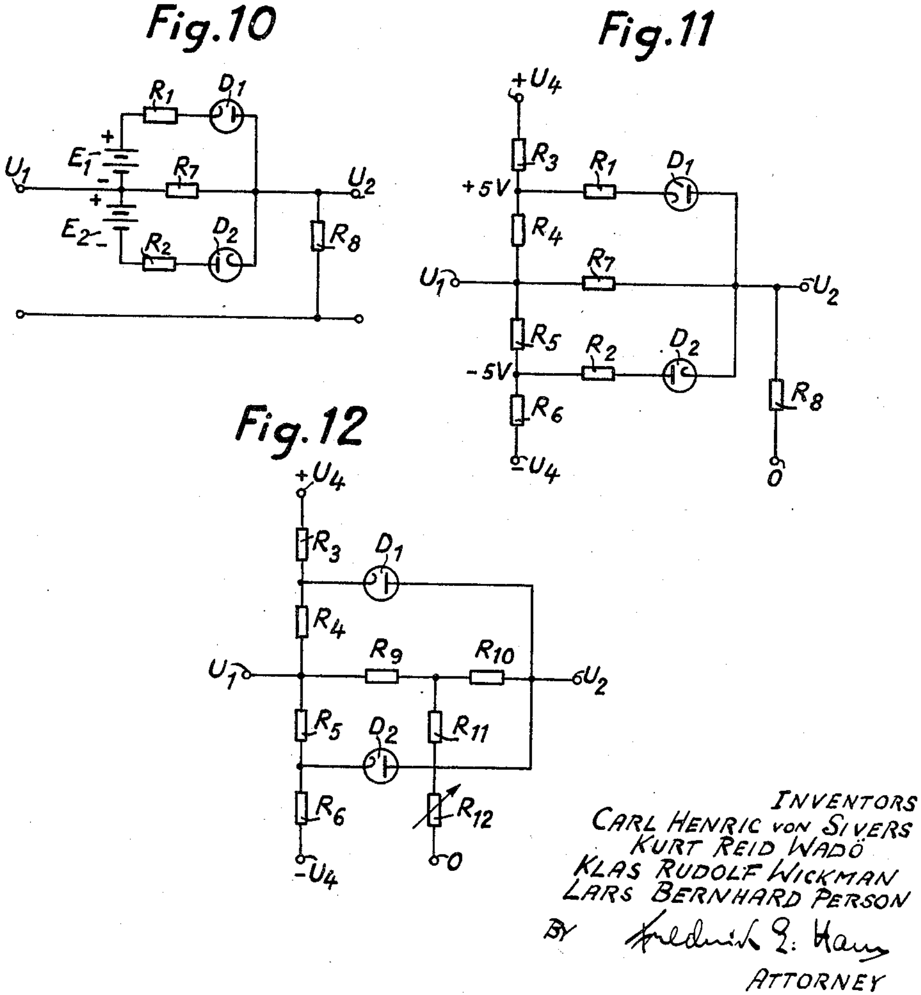
Fig. 10 is a circuit system of a modified expandor according to the invention.
Fig. 11 is a circuit diagram of a modified expandor of the type shown in Fig. 10.
Fig. 12 is a circuit system of another modification of an expandor according to the invention.

Fig. 10 shows another embodiment of an expandor according to the invention. Here, the diodes $D_1$ and $D_2$ of the expandor are in series with the signal rather than in shunt as in the preceding embodiment. The diodes $D_1$ and $D_2$ respectively are in parallel to a series resistor $R_7$ in a L-network whose parallel resistor is designated by $R_8$. The diodes are biased from batteries $E_1$ and $E_2$ respectively. The diodes $D_1$ and $D_2$ are normaly non-conductive and have a back resistance which is considerably higher than the resistance of resistor $R_7$. Thus, for a signal of low amplitude there is obtained an attenuation whose magnitude is determined by the resistances of resistors $R_7$ and $R_8$. For a signal of high amplitude, one of the diodes above a certain level becomes conductive, the diode $D_1$ for negative amplitude peaks and the diode $D_2$ for positive ones. For example for a positive amplitude peak, the resistor $R_7$ is coupled in parallel with a resistance composed of the series resistance of the resistor $R_2$ and of the diode $D_2$ in series. The series branch of the L-network, thereby, receives a low resistance value, with the result that the damping is low for the parts of the signal lying above the aforementioned level.

Fig. 11 shows how the sources of bias $E_1$ and $E_2$ of the diodes may be replaced by a voltage divider consisting of the resistors $R_3$, $R_4$, $R_5$ and $R_6$.

Fig. 12 shows an expandor based upon the same principle as the one shown in Figs. 10 and 11, but somewhat modified. The series resistors $R_1$ and $R_2$ for diodes $D_1$ and $D_2$ are omitted or may be said to be incorporated entirely in resistors $R_4$ and $R_5$. The attenuation network which according to Figs. 10 and 11 consisted of a simple L-network with the series resistor $R_7$ and parallel resistor $R_8$ is now shown as a T-network with series resistors $R_9$ and $R_{10}$ and a parallel resistor $R_{11}$ in series with a variable resistor, such as a potentiometer $R_{12}$. By means of the latter it is possible to adjust the attenuation, that is, the slope of the line OK in Fig. 2 for the exact compensation of the amplification curve of the compressor. In other respects, the expandor of Fig. 12 functions in the same manner as those shown in Figs. 10 and 11.

It is also possible to use two or more systems in series in order to obtain two breaks and, thereby, a still better signal-to-noise ratio.

Figure 13:
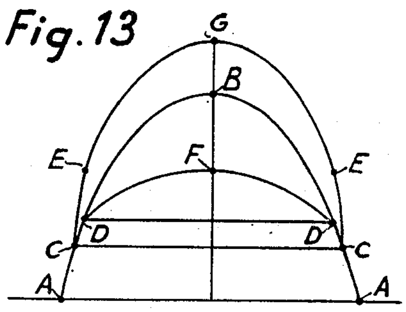
Figs. 13 and 14 are graphs illustrating distortions of signals.

If the expandor does not exactly compensate the amplification characteristic of the compressor a distortion of the signal occurs. In Fig. 13, there is shown the original signal which is assumed to consist of a semi-sinusoidal wave A—D—B—D—A. The compressor produces a lower amplification for those parts of the signal which are above level D—D. The original signal A—D—B—D—A of the compressed curve A—D—F—D—A is shown after being affected by the compressor. The expandor is intended to provide a higher amplification for those parts of the signal which exceed the level D—D so that the amplitude peak D—F—D is raised and becomes congruent with the original amplitude peak D—B—D, as a result of which the original signal is formed again without distortion. Let it now be assumed that the expandor produces the higher amplification already for those parts of the signal which are above the level C—C. The parts of the signal between the levels C—C and D—D then receive a much too high total amplification while the remaining parts of the signal experience the desired total amplification. As a final result, the expandor provides a signal A—C—E—G—E—C—A which represents a distortion of the original signal A—C—D—B—D—C—A.

Figure 14:
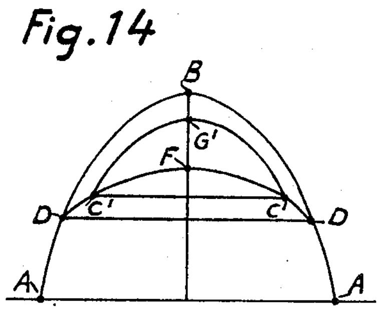
Figure 15:
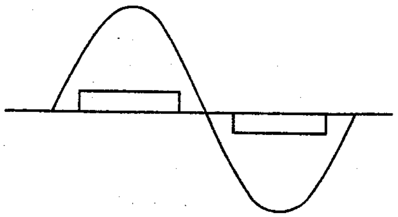
Figs. 15 to 22 are graphs illustrating the calculations of distortions of signals.

In Fig. 14 is assumed that the expandor produces the higher amplification only at the higher level $C^1$—$C^1$. In this way, those parts of the signal which are located between the levels D—D and $C^1$—$C^1$ will be under-amplified. As a final result, the expandor provides a signal A—D—$C^1$—$G^1$—$C^1$—D—A which also represents a distortion of the original signal A—D—B—D—A.

The level at which the amplification in the expandor is changed from one value to another is determined according to the invention by the two biases which are applied to the diodes in the expandor. One bias determines the level at which the amplification is changed for the positive parts of the signal, and the other bias the level at which the amplification is changed for the negative parts of the signal. When these two biases are located equally wrong on both sides, both the positive and the negative parts of a sine potential experience a distortion either according to Fig. 13 or according to Fig. 14. The signal still is symmetric around the time axis, for which reason only odd harmonics of the sine potential are formed. If the amplication can be changed ahead of the expandor for the signal so that the level D—D coincides with the level C—C, or $C^1$—$C^1$, respectively, the distortion will disappear. When the positive bias is not as high as the negative bias, the signal is asymmetric around the time axis. Thus, for instance, the positive half-period of a sine potential may be subject to distortion according to Fig. 13, and the negative half according to Fig. 14, or vice versa. If the positive and negative biases can be changed so that they have the same value, the asymmetry around the time axis disappears. A sine potential which has experienced distortion so that the signal is asymmetric around the time axis, contains both even and odd harmonics.

Figs. 15 to 22 illustrate how it is possible to calculate the harmonics of a signal which has experienced distortion because of the fact that the amplification curve of the expandor does not exactly compensate that of the compressor. The distortion which a sinusoidal signal undergoes according to Fig. 13 can be approximated by a rectangular potential superposed on a sine potential according to Fig. 15.

Figure 16:
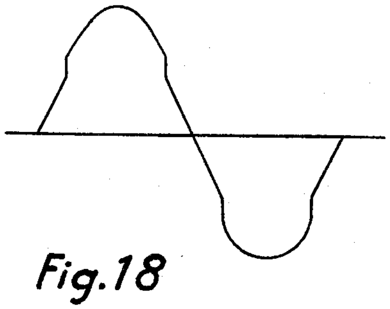
Figure 17:
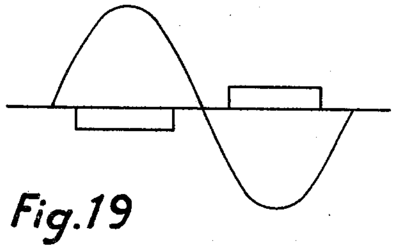

Fig. 16 shows the result, which agrees very closely with the distorted sine wave according to Fig. 13. When the rectangular potential is displaced by 180°, a curve according to Fig. 18 is obtained by means of superposition according to Fig. 17.

Figure 18:
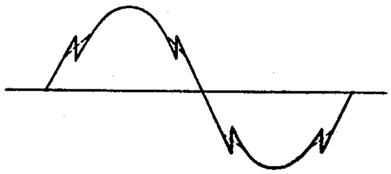

If the harmonics with a higher ordinal number than for instance 6 are neglected, the sharp notch in the curve of Fig. 18 will be smoothed out, as is shown by dotted lines. The form of the curve then agrees approximately with that shown in Fig. 14. The curves according to Figs. 16 and 18 are symmetric around the time axis.

Figure 19:
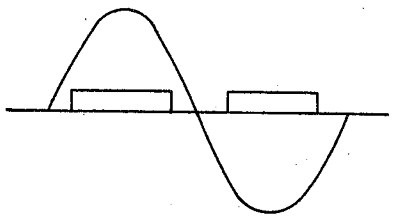
Figure 20:
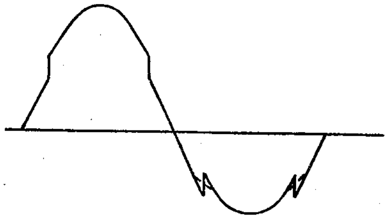
Figure 21:
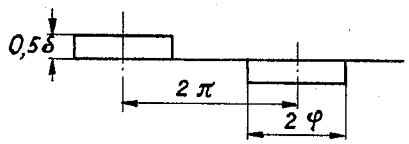
Figure 22:
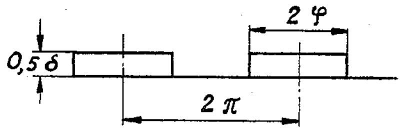
Figure 23:
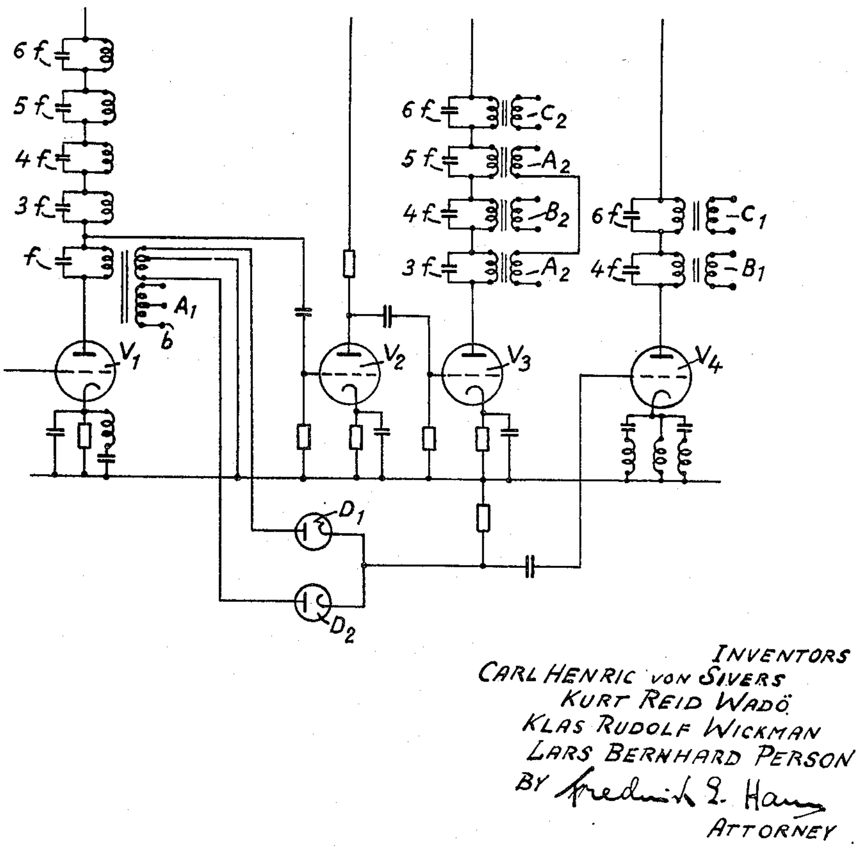
Figs. 23 to 27 are circuit systems according to the invention for automatically compensating distortions of signals.

If the superposed rectangular potential during the entire time is positive according to Fig. 19, a distorted curve according to Fig. 20 is obtained which is asymmetric around the time axis. In order to calculate the harmonics in a distorted curve, which is obtained by superposition of a sinusoidal and a rectangular potential, it may be assumed that the harmonics come from the rectangular potential. The value of the harmonics is derived from the Fourier equation for the superposed rectangular potential. This equation is:

$$U(t)=\varrho\left(\frac{\varphi}{2\pi}+\frac{1}{\pi}\sum_{n=1}^{\infty}\frac{1}{n}\sin n\varphi\cos n\omega t\right)-$$

with references according to Figs. 21 and 22.

For the rectangular curve according to Fig. 21, that is, with a distortion according to Fig. 16 and Fig. 18 (signal symmetric around the time axis), $n$ includes only odd integrals while for the rectangular curve according to Fig. 22, with a distortion for example according to Fig. 20 (signal asymmetric around the time axis) $n$ includes both odd and even numbers.

For a multi-channel system, for instance a pulse-amplitude-modulated system, there can be used a circuit system, for example according to Figs. 23 to 27 for the automatic adjustment of the amplification curve of the expandor so that the latter exactly compensates the amplification curve of the compressor. One of the channels of a pulse-amplitude-modulated multi-channel system is modulated with a sine wave having a relatively low frequency $f$ within the speech band. From the corresponding channel demodulator, the signal is applied to the grid of amplifier tube $V_1$ in Fig. 23. This signal contains harmonics of the frequency $f$, if the adjustment of the expandor is not correct. The plate of the amplifier tube $V_1$ is connected to its bias across a number of series-coupled parallel circuits tuned to the resonance for the frequency $f$, respectively the harmonics $3f$, $4f$, $5f$ and $6f$. The oscillatory circuit which is tuned for the frequency $f$ feeds across the diodes $D_1$ and $D_2$ as frequency doubler an amplifier tube $V_4$ to the plate circuit of which two series-coupled parallel circuits, tuned for the frequencies $4f$ and $6f$, are connected. Further, the harmonics from $3f$ to $6f$ inclusive are taken out of the plate circuits of the amplifier tube $V_1$ across the amplifier tube $V_2$ and applied to the grid of an amplifier tube $V_3$. The plate of this tube is connected to its bias across four series-coupled parallel circuits tuned for harmonics $3f$, $4f$, $5f$ and $6f$.

Figure 24:
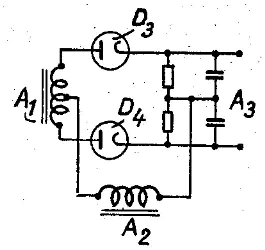
Figure 25:
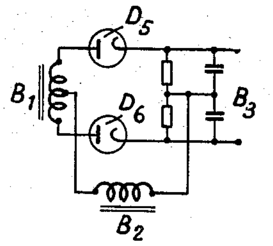
Figure 26:
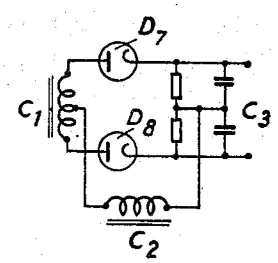

Figs. 24, 25 and 26 show three phase-selective discriminators.

At $A_1$ of Fig. 24, a control potential with the frequency $f$ is applied from the tap $A_1$ of the plate circuit of amplifier tube $V_1$. At $A_2$ in Fig. 24 is applied a combined potential of the frequencies $3f$ and $5f$ (thus odd harmonics) from the tap $A_2$ of the plate circuits of the amplifier tube $V_3$. As a result, a control potential is obtained at $A_3$ in Fig. 24 whose value and sign are determined by the value and phase of the odd harmonics which belong to the signal fed to the grid of tube $V_1$. If the level of the expandor, where the amplification of the expandor is changed from one value to another, is in the wrong position, a distortion of the signal applied to the grid of tube $V_1$ occurs. The odd harmonics formed in the distortion produce a control potential at $A_3$, which control potential is applied to the grid of the amplifier tube $V_5$ in Fig. 27, whereby the plate current of the latter tube is controlled. Two lamps $G_1$ and $G_2$ (or other impedances whose resistance varies with the currents through them) act as plate load. The whole pulse train is applied at point D and is taken out again across point E at point F. The series resistor $R_1$ and the lamps $G_1$ and $G_2$ form an attenuator for the signal, with the result that the damping varies with the control potential applied at $A_3$. This adjusts the correct level in the expandor so that the amplitude of the odd harmonics is always at a minimum.

Figure 27:
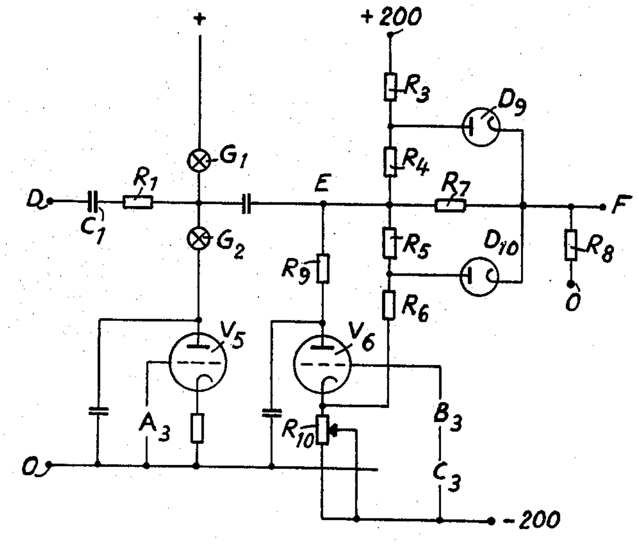

Fig. 27 shows an expandor similar to that shown in Fig. 10 and comprising resistors $R_3$ to $R_8$ and diodes $D_9$ and $D_{10}$. If the biases across the diodes, that is, the potentials across resistors $R_4$ and $R_5$ are not alike, a signal distortion occurs, according to Fig. 20, for instance, the signal is asymmetric around the time axis. The signal then contains even harmonics. From the taps $B_2$ and $C_2$ in Fig. 23, the fourth and sixth harmonics $4f$ or $6f$, respectively, are taken out (see Figs. 25 and 26). At taps $B_1$, or $C_1$, respectively, there are applied harmonics $4f$ or $6f$, respectively, obtained by filtering out the 4th and 6th harmonics after the diodes $D_1$ and $D_2$ and, accordingly, from the fundamental frequency. There are then obtained at taps $B_3$ and $C_3$ in Figs. 25 and 26 control potentials whose value and direction are determined by the fourth and sixth harmonics belonging to the signal. These control potentials are applied to the grid of amplifier tube $V_6$ whose plate current is thereby controlled. In this way an adjustable potential drop is obtained in the resistor $R_9$, whereby the potential of the point E is regulated with respect to ground so that the biases across the diodes $D_9$ and $D_{10}$ are equally high. The asymmetry of the signal around the time axis then disappears, and the amplification curve of the expandor compensates automatically that of the compressor. In the embodiment, the 3rd and 5th, as well as the 4th and 6th harmonics are used for the control of the amplifier curve of the expandor. Naturally, there can be used other harmonics, or, for instance, only one one odd and one even harmonic in order to produce the control potentials. In the latter case, however, one has to make sure that neither the odd nor the even harmonic has a phase-dependent neutral position within the control region.

Similar compensation arrangements based upon the application of compressors and expandors with amplification curves having one or more definite breaks with constant slopes in between, will, of course, also come within the scope of the invention.

In the compression and expansion of amplitude-modulated pulses in a multi-channel system in which the amplification curves have two breaks, the amplification curve of the expandor can be regulated in the following manner. One channel is modulated with a sine potential of such a low amplitude that it is distorted only by one break in the amplification curve of the compressor. The said channel is demodulated at the receiving end, and the thereby formed harmonics are used for the automatic adjustment of the corresponding break in the amplification curve of the expandor. Another channel is modulated with a sine potential of such high amplitude that it is distorted by both bends in the amplification curve of the compressor. The latter channel is demodulated at the receiving end, and the thereby formed harmonics are used for the automatic adjustment of the position of the other break in the amplification curve of the expandor.

We claim:

1. In a circuit system for momentarily compressing and expanding signals in installations of the type described, an attenuation network comprising compressor means and expandor means, each including amplifying means effecting a certain constant amplification for signal amplitudes up to a predetermined level and a different amplification of the part of signals above said predetermined level so that the total amplification of both the compressor and expandor means together is constant and equal for all signal amplitudes, said compressor and expandor means each further including a voltage divider having series connected impedance and diode means connected in circuit so as to impart in conductive condition a certain constant attenuation to the attenuation network and in non-conductive condition a different constant attenuation to the attenuation network, circuit control means for changing the diode means directly in response to the signal from the conductive condition to the non-conductive condition and vice versa in response to the momentary amplitude of the signals means for generating a control signal and feeding it to said compressor means, and means in said expandor responsive to said control signal to coordinate the operation of said expandor with said compressor.

2. A circuit system as defined in claim 1, in combination with amplitude limiting means coupled with the compressor means.

3. A system as defined in claim 1 for amplitude-modulated successive pulses in a multi-channel system, in combination with means for applying a discharge pulse to at least one of said compressor and expandor means so as to discharge from the said means stray capacitances residual from a pulse applied to a channel, the said discharge pulse, for the period of its duration, reducing the time constant for discharging in comparison to the time constant required without the influence of the discharge pulse and being effective for the time interval between the termination of the useful phase of a channel pulse and the beginning of the useful phase of the next successive pulse.

4. A system as defined in claim 1, wherein at least one of said compressor means and expandor means comprise more than one stage, whereby the amplification curve of the respective means includes at least one break.

5. A system as defined in claim 1, in combination with means indicating an incorrect amplification of a sinusoidal signal, said indicating means being responsive to odd harmonics generated by the distortion of the said signal due to a failure of the amplification curve of the expandor means to compensate exactly the amplification curve of compressor means, the said distortion of the signal further causing even harmonics, at least one phase-selective discriminator means, circuit means for feeding said even harmonics to said discriminator means for producing a control potential controlled as to value and direction by the value and phase of said even harmonics, and circuit means automatically controlled by said control potential and automatically regulating the amplitude level of the expandor means at which the amplification changes from one value to another to a level equally high for positive and negative signal amplitudes.

6. A system as defined in claim 1 for amplitude-modulated successive pulses in a multi-channel installation, in combination with means for modulating one of the channels in the pulse train with a sine potential of a definite frequency, the said sine potential including odd harmonics formed after the demodulation of the said channel being applied to regulate automatically the amplification of the amplitude-modulated pulse train and reformed even harmonics of the sine potential being applied to regulate automatically the amplitude level in the expandor means at which the amplification of the amplitude-modulated pulses changes from one value to another to a level equally high for positive and negative pulse amplitudes.

7. A signal transmission system comprising a compressor and an expander for compressing the signals prior to transmission and expanding them to their original state prior to reproduction, means for periodically interrupting the signals to be transmitted and introducing a low frequency signal into the system at a point before the compressor, switching means at the output side of the receiving end of said transmission system and interconnected with said expandor for periodically removing said low frequency signal after treatment of the first said signals by the expandor, said low frequency signal including harmonics thereof produced by the action of said compressor, means including a filter and at least one discriminator for converting at least one of the harmonics of said low frequency signal to a voltage having a value and sign corresponding to the value and phase of said harmonic, and means connected with said expandor for modifying the action thereof in accordance with said voltage to produce an expanded signal corresponding to the original signal fed into the compressor.

8. In a signal transmission system according to claim 7 wherein at least two sets of voltages are produced one corresponding to the value and phase of the even harmonics and the other corresponding to the value and phase of the odd harmonics, means responsive to said one voltage for modifying the magnitude of the signal input to said expandor and said other voltage connected to said expandor to modify its response to the signal input whereby the expanded signal is automatically conformed with the original signal before compression.

9. A signal transmission system comprising a signal transmitter including an instantaneously operating compressor having substantially zero attenuation below a predetermined amplitude level, and at least one other constant attenuation above said level, means at said transmitter for generating a sine wave signal to be transmitted by said transmitter, and an expandor coupled with the transmitter for receiving transmitted signals including said sine wave, said expandor including a variable gain amplifier, a multiple level attenuator, means for separating said sine wave signal and its harmonics that may result from compression at said transmitter from other received signals, filter means for separating at least one even and one odd harmonic from said received sine wave, means for generating a first control voltage from said odd harmonic for controlling the gain of said variable gain amplifier, and means for generating a second control voltage from said even harmonic for controlling said multiple level attenuator.

10. A system as defined in claim 1, wherein said control signal generating means generates a sinusoidal signal, and said control signal responsive means in said expandor includes means responsive to at least one odd and one even harmonic of said control signal caused by failure of the expandor exactly to compensate for the action of said compressor.

11. A signal transmission system comprising a transmitter and a receiver coupled therewith, said transmitter including an instantaneously acting compressor for modifying signals applied to the transmitter for transmission through said system so that the ratio of then applied and transmitted signals will be different and constant at least within two different ranges of amplitude of the applied signal and said receiver including an expandor for modifying the received signal and having an attenuation network including at least one resistor, at least two diode means and means for biasing said diodes, said diodes being oppositely polarized and conducting and above predetermined potential levels applied to said network, the ratio of the received signals and the output signals as modified by the expandor being different and constant within different ranges of amplitude of the received signal, means for applying a pilot signal to said compressor, means in the transmitter responsive to changes in the pilot signal produced by said compressor, said changes being in the form of odd and even harmonics of said pilot signal, means responsive to changes in phase and magnitude of the even harmonics of the pilot signal for modifying the amplifying characteristics of the expandor and means responsive to the magnitude and phase of the odd harmonics of said pilot signal for modifying the biasing potential of at least one of the diode means in said expandor.

References Cited in the file of this patent

UNITED STATES PATENTS

| | | |
|---|---|---|
| 1,737,830 | Crisson | Dec. 3, 1929 |
| 2,003,428 | Cowan | June 4, 1935 |
| 2,171,671 | Percival | Sept. 5, 1939 |
| 2,193,966 | Jones | Mar. 19, 1940 |
| 2,213,991 | Mitchell | Sept. 10, 1940 |
| 2,252,002 | Halsey | Aug. 12, 1941 |
| 2,387,652 | Dickieson | Oct. 23, 1945 |
| 2,434,155 | Haynes | Jan. 6, 1948 |
| 2,438,518 | Piety | Mar. 30, 1948 |
| 2,560,709 | Woodward | July 17, 1951 |